Sept. 12, 1961 C. R. YOUNG ET AL 2,999,242
SADDLE STITCHED BOOK MAKING MACHINE
Filed June 10, 1960 7 Sheets-Sheet 1
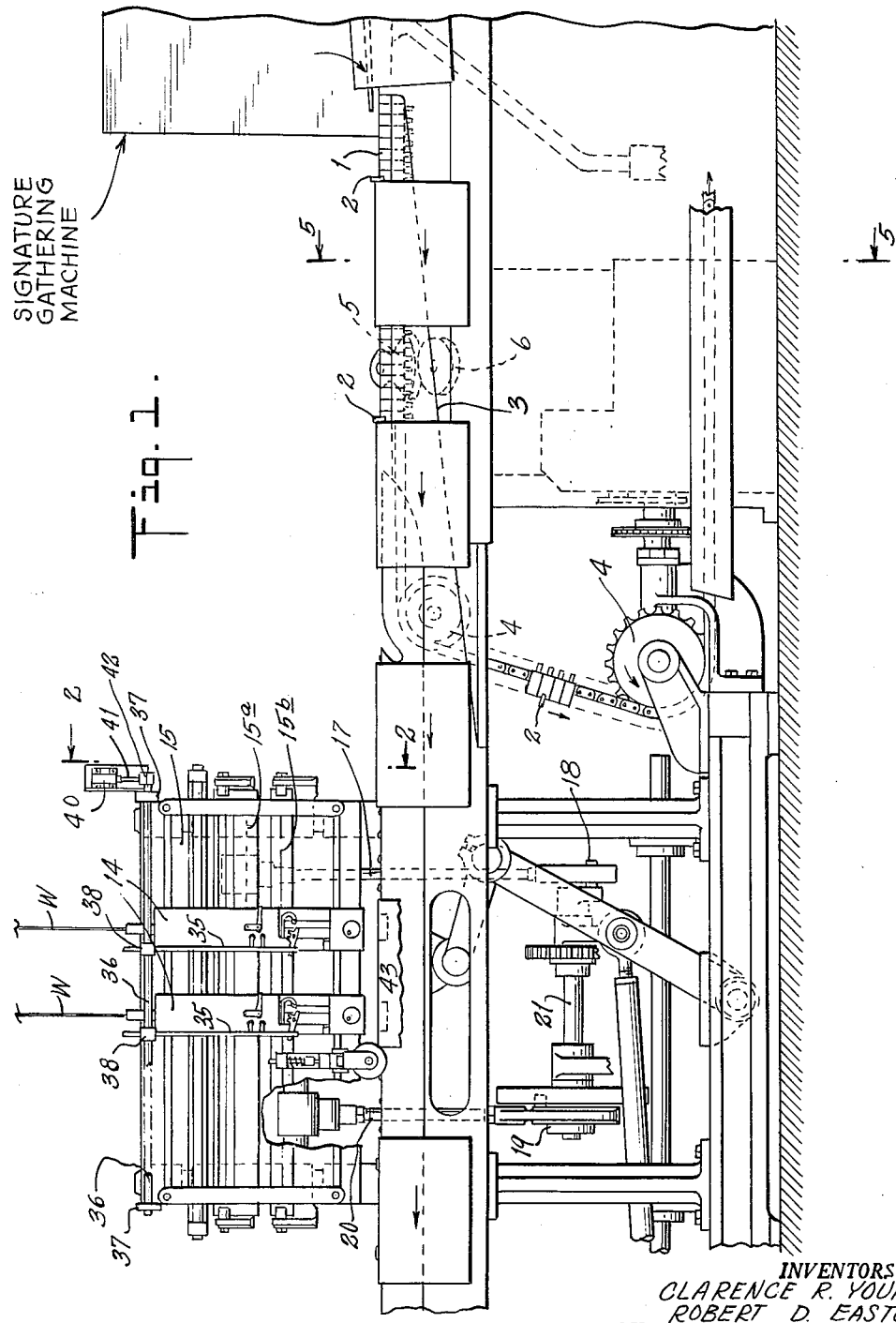
INVENTORS
CLARENCE R. YOUNG
ROBERT D. EASTON
BY
Kenyon & Kenyon
ATTORNEYS

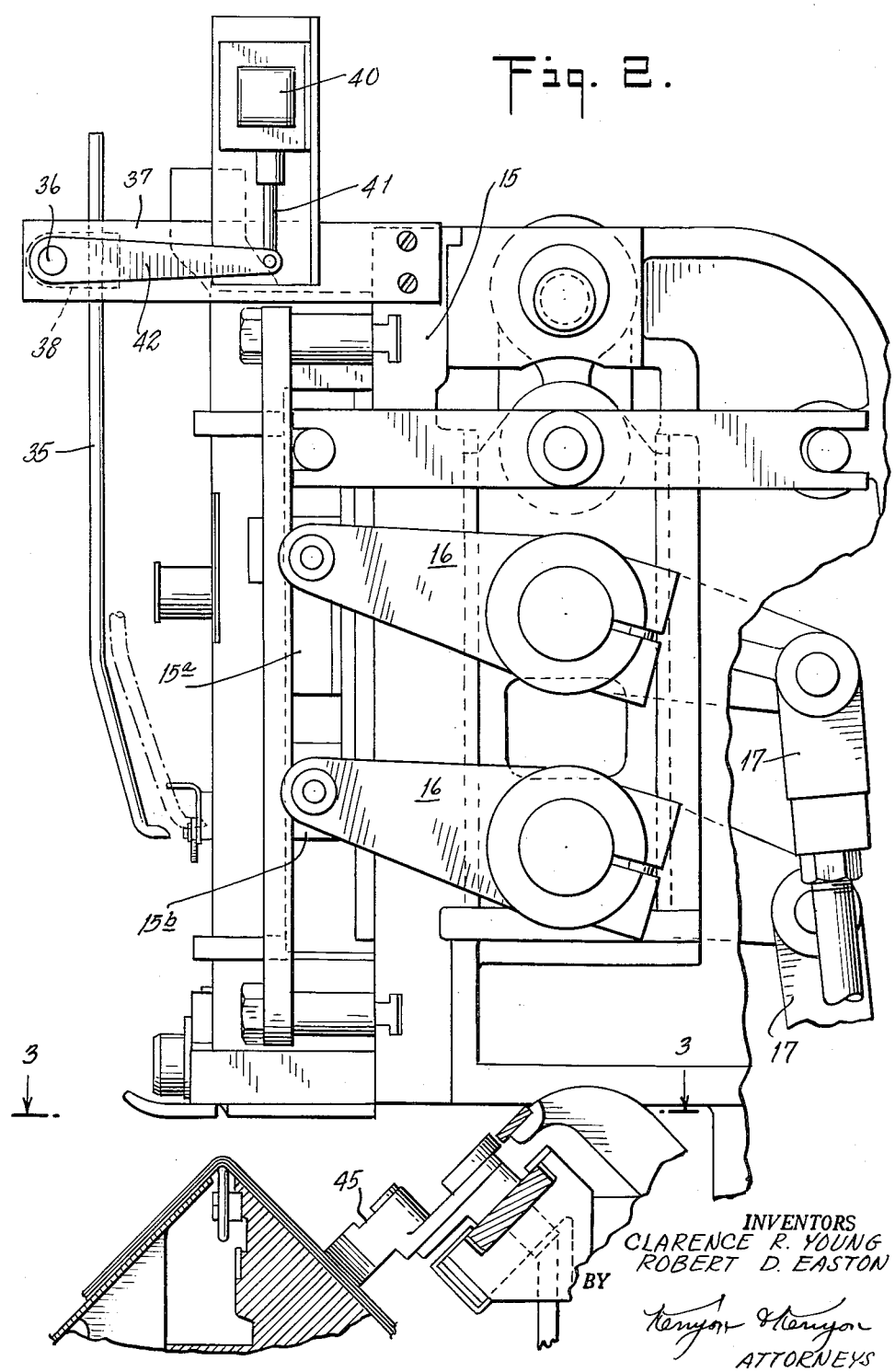

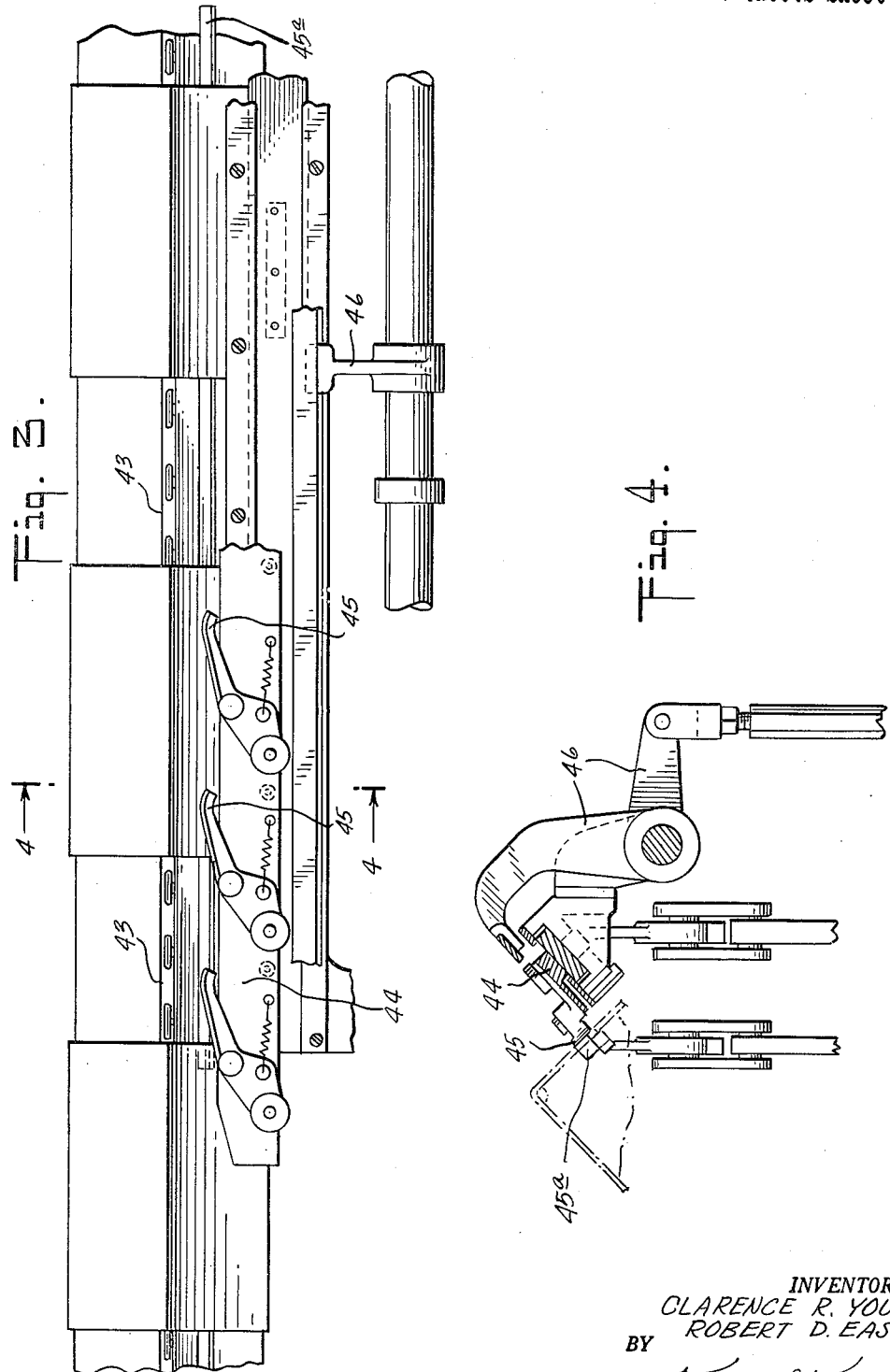

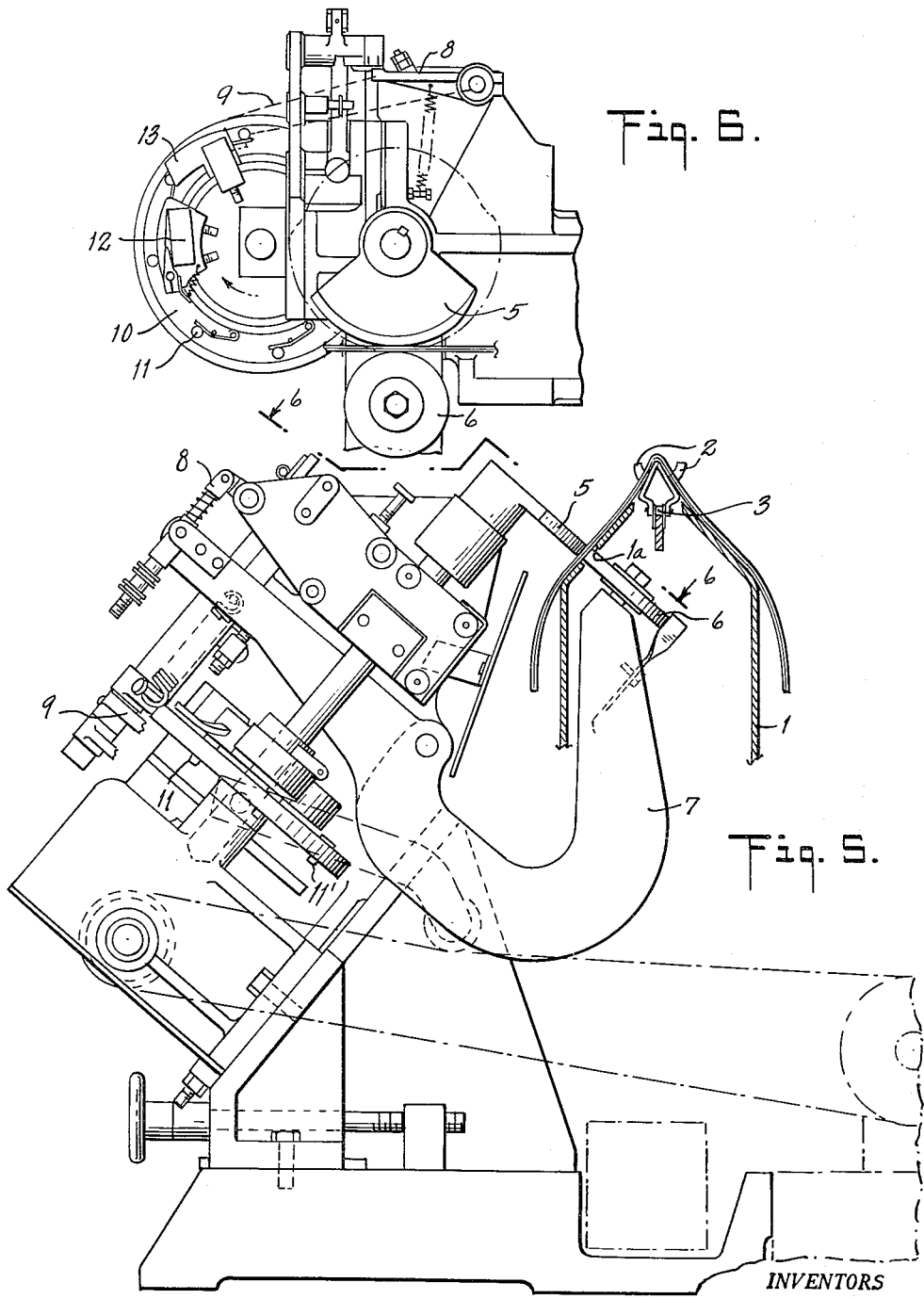

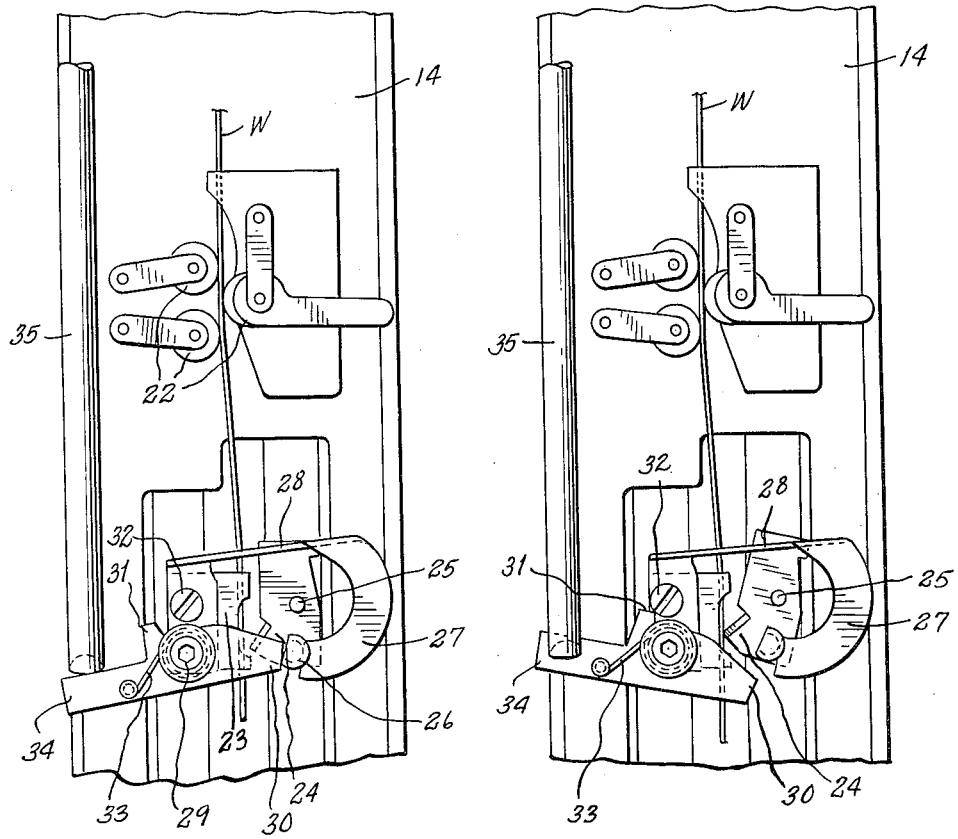

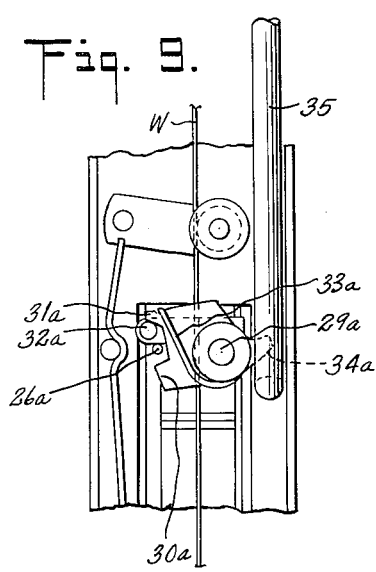
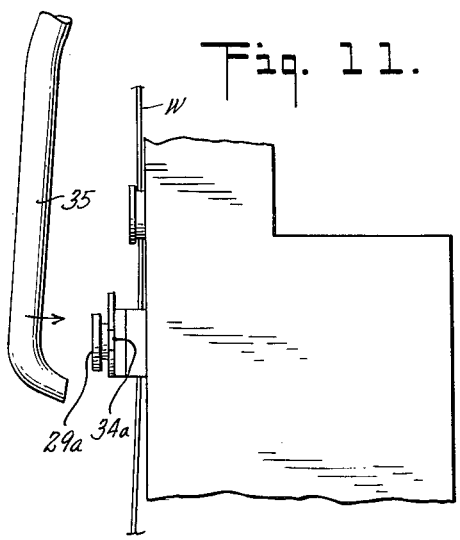
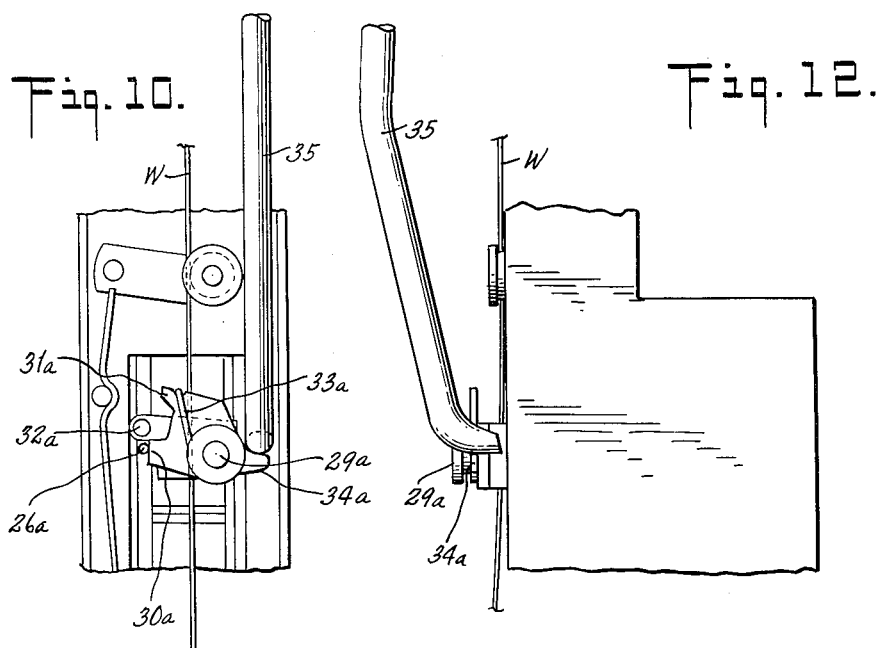

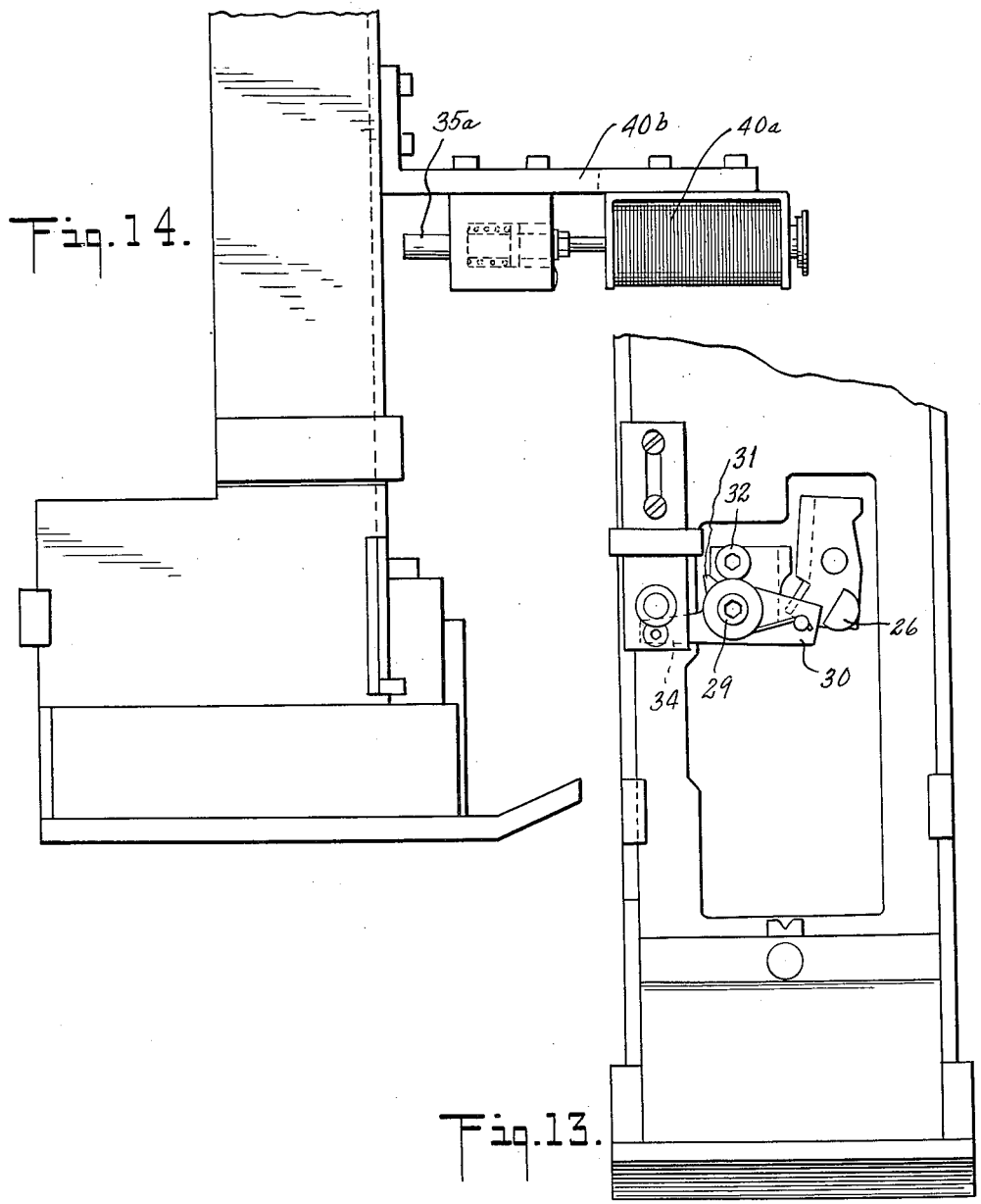

2,999,242
Patented Sept. 12, 1961

2,999,242
SADDLE STITCHED BOOK MAKING MACHINE
Clarence R. Young, Easton, Pa., and Robert D. Easton, Santa Ana, Calif., assignors to T. W. & C. B. Sheridan Co., New York, N.Y., a corporation of New York
Filed June 10, 1960, Ser. No. 35,358
2 Claims. (Cl. 1—105)

This invention relates to a saddle stitched book making machine. The principles of the invention may be applied to other machines.

The machine incorporates means for feeding a plurality of books in series to a stitching station where an automatic book stitcher is located. The books are assembled for saddle stitching and are opened at least sufficiently to permit them to be bound by stitching when fed to the stitcher. The books are calipered prior to reaching the stitcher to provide for the detection of improperly assembled books and missing books in the series or flow of books being fed to the stitcher. Operation of the stitcher on an improperly assembled book or when a book is missing is undesirable.

One object of the present invention is to prevent the operation of the stitcher in such cases of defective or missing books, without resulting in the mechanical shock and noise incidental to stopping the stitcher's driving or powering mechanisms. In other words, the idea is to provide a machine of the kind described which is freed from the momentum and inertia forces incidental to the stopping and starting of the necessarily heavy and rapidly moving gear and lever trains and systems and other parts required to operate the stitcher, each time there is a missing book or a defective book in the flow of unstitched books fed to the stitcher.

Other objects may be inferred from the following description of a specific example of the invention as it is applied to a book making machine using a saddle stitcher. This description is aided by the accompanying drawings in which:

FIG. 1 is a side view of this machine;

FIG. 2 is a cross section taken on the line 2—2 in FIG. 1;

FIG. 3 is a horizontal section looking downwardly on the line 3—3 in FIG. 2;

FIG. 4 is a cross section taken on the line 4—4 in FIG. 3;

FIG. 5 is a cross section taken on the line 5—5 in FIG. 1;

FIG. 6 is a view of the mechanism shown by FIG. 5 looking diagonally downwardly on the line 6—6 in FIG. 5;

FIGS. 7 and 8 are enlarged side views showing pertinent portions of the automatic stitcher heads, FIG. 7 showing one phase and FIG. 8 another phase in the operation, as explained by the specification hereinafter;

FIGS. 9 and 10 correspond to FIGS. 7 and 8 excepting that in this instance another type of automatic stitcher head is illustrated;

FIGS. 11 and 12 are side views of FIGS. 9 and 10 respectively showing the motions of the parts during the two phases explained hereinafter;

FIG. 13 is a front view of an automatic stitcher head showing a modification of the invention; and FIG. 14 is a side view of FIG. 13.

Referring first to FIG. 1, the left-hand end of a signature gathering machine is shown, the machine being represented merely by a box outline since it may be any of the conventional types. Such a machine may comprise a number of hoppers into which the groups of signatures obtained from the printing press are placed, each hopper then delivering the signatures to a travelling conveyor so that the signatures drop from each succeeding box on those obtained from a preceding box, whereby the signatures are assembled or collated as required to produce the book desired. Usually the last hopper contains the covers for the book.

The assembled signatures form gathered books requiring stitching. Each gathered book leaves the gathering machine astride a conveyor chain 1 in front of a chain pin 2, or pusher, which engages the book. In effect, half of each book is on one side of the chain and the other half is on the other side of the chain. The chain travels continuously and has a series of the pins 2 which each engage a gathered book. Flares 3 on each side of the chain 1 gradually open each travelling gathered book enough to permit calipering of each book. The chain 1 loops around sprocket wheels 4 located as required to guide the chain, which is endless, and at least one of these sprocket wheels is powered.

Sometimes one or more of the signature hoppers of the gathering machine may inadvertently become exhausted and sometimes all of the hoppers may become exhausted, in which event one or more of the pins may have in front of it either an improperly assembled group of signatures or possibly none at all.

In view of the above a book caliper is located shortly beyond the gathering machine. As shown by FIGS. 5 and 6 this caliper comprises an anvil wheel segment 5 timed by the gearing of the machinery to rotate against the outside of the zone in front of each of the pins where the gathered signatures are or should be located. At this point a caliper wheel 6 has access to press towards the segmental anvil wheel 5 and the half of that side of any signatures that may be therebetween. This wheel 6 has a calipering action by reason of being mounted on one end of a two-armed lever 7, the other end of which works through a motion multiplying leverage system 8 to swing an arm 9.

This caliper is of the memory or data storing type by reason of having a pinwheel 10 mounting a series of push pins 11 which are pushed upwardly whenever the arm 9 is swung due to the caliper wheel 6 detecting either too few a number of signatures or no signatures at all. This pinwheel 10 and segmental anvil wheel 5 are driven synchronously with the motion of the chain 1. The peripheral travelling path of the pins 11 and the interspacing of the latter peripherally with respect to the wheel 10 are all such that when the zone in front of anyone of the pins 2 is subjected to the calipering action, that pin will ultimately register with an electric limit switch 12 designed for actuation if the pin 11 registering with it is pushed upwardly. A cam 13 positioned just beyond this limit switch serves to push the pins downwardly to reset them.

In the present invention the just previously mentioned registration, due to the peripheral pin spacing and so forth, actuates the limit switch 12 at the appropriate time to deactivate the wire feed in the heads so that no staples will be formed and driven when the incorrectly gathered book or missing book zone reaches the stitching station of the book stitcher required to stitch the gathered books on their fold lines to produce stitched books ready for trimming.

The stitcher is shown at the far left in FIG. 1. The stitching station or location is established by the location of the automatic wire stitching heads 14 of which only two are shown in FIG. 1. In many instances three of these heads are required, the number depending on the number of stitches required to make a book of the desired bound strength. One largely used automatic stitcher head which may be used is that sold under the trade mark "Bostitch." In all instances each such head is fed with a supply of wire W and has a mechanism whereby as the head operates the wire is automatically fed downwardly, one stitch or staple length at a time, and the length is cut and formed into a staple which is driven into the article, to be stitched, by way of its legs, the latter then being clinched.

Such an automatic stitcher head is necessarily operated by parts which must be rapidly reciprocated. These parts and their driving mechanism must be strong and therefore heavy. Any machine using these heads and having a high production rate of stitched articles necessarily must operate these heads very rapidly.

The book stitcher shown may be called a gang type having two or more stitcher heads 14. Each head is mounted on a face plate casting 15. The head mechanisms are operated by bars 15a and 15b which must be reciprocated by systems including the parts 16, 17, 18, etc. which must be strong and therefore heavy. The wire bender cross bar, which is one of the bars 15a and 15b, must be driven by a bender operating cam 19, for example. All are necessarily heavy parts and once in operation it is undesirable to stop and restart their normal operational motions.

As long as such moving parts can be kept moving the power requirements for the machine are kept at a minimum and shock and noise are correspondingly kept as low as possible. All of the parts must move rapidly and it is undesirable to stop and start these parts each time the previously described signature caliper indicates that the stapling action should be deactivated. If not deactivated the staples may cause jams requiring stopping not only of the stitcher but of the signature gathering machine as well and, of course, also the trimmer to which the stitched books might be fed in a production line book making assembly.

The present invention takes advantage of the fact that all automatic stitcher heads used by saddle book stitching machines have a wire feeding mechanism involving grippers which reciprocate relative to the head and which grip the wire when moving in a wire feeding direction and which release from the wire when moving in an opposite direction, thus to intermittently feed the wire in staple lengths as required to form the staples which stitch the signatures to produce the bound books ready for trimming. Detailed disclosures of such wire feeding mechanisms are provided by the Briggs Patent No. 970,461, issued Sept. 20, 1910, and the Maynard Patent No. 1,252,011, issued Jan. 1, 1918.

With the above in mind, FIGS. 7 and 8 show the pertinent portions, of one of the heads 14, required to illustrate the grippers and an essential phase of the present invention. It can be seen in FIG. 7 that the wire W feeds downwardly through the wire straightening rollers 22 and between a fixed wire gripper 23 and a moving wire gripper 24, the latter being spring biased to clamp against the former and the wire therebetween, this action being shown by FIG. 8. The two grippers 23 and 24 move downwardly together, relative to the head 14, when gripping the wire as shown by FIG. 8, thus feeding a wire length as required to form a staple, and the automatic head contains mechanism which then opens the grippers against the mentioned spring bias, and the grippers then move upwardly while released as shown in FIG. 7. The fed wire length is cut off and during a following operation is processed and stitched into the book fold line of the signatures.

In this instance the moving gripper 24 is pivotally mounted on a pin 25 for pivotal action, the gripper's swinging end having a stud 26 against which the curving rigid end 27 of a cantilever spring 28 bears. The spring 28 must be deflected to effect separation of the grippers.

It is to be observed that in these automatic heads the only force that urges the grippers together is a spring force which the internal mechanism of the head is permitted to exert during the feeding stroke of the grippers and which is restrained or resisted so as to hold the gippers during the latter's return stroke.

Now in accordance with the present invention a latch in the form of a two-armed lever mounted by a pivot pin 29 is fixed to the stationary one 23 of the vertically reciprocative grippers, it being understood that the stationary one reciprocates vertically but is stationary relative to the pivoted gripper 24. This lever has an end 30 which can be rocked into engagement with the pin 26 of the pivoted gripper 24 so as to latch or prop the latter open against the bias of its spring 28. The lever is prevented from rotating clockwise too far by a short projection 31 which engages a fixed stud screw 32, and a torsion spring 33 serves to bias the latch to an unlatched position. When latched, this spring 33 is insufficiently strong to overcome the pressure exerted by the pin 26 to effect unlatching. When the pin 26 is lifted free from the lever 30 during the operation of the head, the spring 33 will return the latch to its unlatched position. The other arm 34 of the two-armed lever forming this latch is adapted to be engaged by a finger 35 (FIG. 2) which depends from a shaft 36 which is pivoted in bearings 37 fastened to the stationary face plate casting 15 of the stitcher. Each finger is fastened to the shaft 36 by a clamp block 38 permitting adjustment of the finger as required to make it work properly with its associated stitching head which is adjustably fastened to the face plate casting 15. The heads must be adjusted as required to stitch books of different sizes, at the desired stitching locations. Rotation of this shaft 36 through a limited arc serves to swing the finger 35 inwardly so that as the grippers reach the position where the automatic head mechanism would release the gripper 24 the lower end of this finger 35 is engaged by the latches' lever arm 34 with consequent latching action so as to hold the wire grippers latched open. Each time during the operation of the head that the grip release slide of the head opens the wire gripper, the latch is freed so that the spring 33 can return it to its inoperative position.

Each of the heads 14 is provided as described for this latching and unlatching action whereby to deactivate the stitching wire feed action of each automatic stitcher head. Thus by turning the shaft 36 so as to swing the fingers 35 inwardly as the stitcher heads operate it is possible to deactivate the stitcher heads as they go through one cycle. When the finger 35 remains outwardly and free from the long arm 34 of each head, the spring 33 in each instance insures against inadvertent latching action.

Swinging of the fingers 35 to their operative positions is effected by an electric solenoid actuator 40 which may be of the type having its plunger 41 spring biased outwardly, this plunger being connected to a lever 42 keyed to the shaft 36 whereby the latter is spring biased to a finger deactivating position. Alternately the fingers 35 can be spring biased outwardly by an external spring. In any event the action is that the fingers 35 remain free from the latch arms 34 normally and swing to engaging positions with these arms when the solenoid 40 is actuated.

Now it becomes apparent that when as previously described the signature caliper detects either a missing or defective assembly of signatures in front of anyone of the chain pins it will initiate means for closing the caliper switch 12 that will result in appropriate action when the defective assembly, or the time cycle of a missing assembly, reaches the stitching location. Therefore, by using this switch 12 through electrically powered wiring (unillustrated) the solenoid 40 may be energized to swing the fingers 35 inwardly so as to latch open all of the wire grippers of all of the automatic latching heads as their parts go through their appropriate reciprocative strokes. Since no wire is fed there can be no attempt at stitching with consequent trouble from the formation of unwanted staples or jamming of the machine due to this. At the same time all of the heavy running parts of the stitchers continue to operate just as though the stitching action was occurring. Stopping and starting of the stitcher is eliminated.

If the next section of the conveyor chain does not have a properly assembled group of signatures, the same thing happens over again. At the termination of each downward stroke of the wire feeding clamps the latch which prevents the wire feeding is unlatched so that, if appropriate, the normal wire feeding action of the stitcher is resumed.

In the prior art machines the switch 12 controls a powered electric circuit connected with a solenoid which controls a clutch between the rotary power and the heavy parts required to actuate the stitcher heads. The necessary electrical circuit is well known. A corresponding kind of circuit may be used with the present invention excepting that in this case the solenoid 40 is energized instead of a clutch solenoid. Thus the wire feed is stopped without stopping the heavy stitcher actuating parts.

The stitching head described is a standard head of relatively large size. FIGS. 9 and 10 show another standard type of automatic stitcher head of a somewhat smaller size. In this instance a different type of latch is used. Here the pin 26a of the transversely movable gripper is latched open again by the end 30a of the latching lever, and although this is still a lever it has somewhat the appearance of a rotary plate. In general the parts correspond to those previously described and are given corresponding numerals, using the small letter a to differentiate them from those of the first example.

In this second example in FIG. 9 the grippers are released so they can grip the wire and in FIG. 10 they are latched against gripping action. The wire gripper jaws are not exposed to view in these figures. However, the pin 26a is fixed to a movable T-shaped wire gripping jaw of the type shown and described by Patent No. 1,252,011.

Book stitchers of the type described are equipped with a mechanism located below the book folds for clinching the wire staple legs as required to stitch the books. This prevents the use of the chain 1 and pins 2 throughout the stitching station.

Therefore, a saddle 43 leads to and extends through the stitching station so that the mentioned mechanisms may operate at the apex of the saddle. The signatures which become stitched books when stitched, are moved throughout this area by a horizontally reciprocative under bar 45a operating in cooperation with a gripper bar 44 provided with spring loaded grippers 45 automatically actuated by a lever system 46 so that as these grippers reciprocate oppositely to the moving direction of the signatures they are retracted, and so as they reciprocate in the direction the signatures were moving, they are released to grip the signatures' pages against the under bar on that side of the saddle. In this fashion the signatures are intermittently moved through the stitcher station. The stitched books may be stacked and sent to the trimmer for trimming.

In some instances rotary stitchers are used wherein the automatic stitcher heads are mounted on a frame which can be reciprocated back and forth in the direction a series of gathered signatures is continuously flowing or moving. When the stitcher head frame moves with the movement of the signatures the stitcher head parts are reciprocated as described before but by somewhat different mechanisms, to effect their stapling or stitching action. The latches previously described may be used in this instance also and in the same fashion, the latching fingers actuated by the solenoid under the control of the signature caliper, being mounted to the frame which is in this case moving in a generally rotary fashion which gives the name rotary stitcher to this type of equipment.

FIGS. 13 and 14 illustrate a modification of the latch operation. The head shown corresponds to that shown by FIGS. 9 and 10. However, each head has its own electric solenoid 40a mounted directly on it by a bracket 40b. This solenoid directly actuates a finger 35a located to be engaged by the latch lever arm 34 when the wire feed clamps go upwardly and the solenoid is energized by the switch 12 of the caliper. Thus, each head can move freely if desired, as it must in a rotary stitcher, yet still have its wire feed under the control of the caliper switch.

We claim:

1. A saddle stitched book making machine including means for feeding books assembled for saddle stitching and in series and opened at least sufficiently to permit them to be bound by stitching, a book stitcher having a book stitching station fed by said feeding means and at least one automatic wire stitcher head and means for successively operating said head in cycles for stitching books successively fed to said station and said head having means for feeding from a wire supply a length of stitching wire and which is normally automatically activated in response to said head's operation during each cycle, means for detecting when said station fails to be fed with one of said books ready for stitching, and means automatically responsive to said detecting means for deactivating said wire feeding means while said head operates through its cycle so that said head may be operated through that cycle without stitching action, said wire feeding means comprising wire gripper jaws reciprocating in a wire feeding direction and return therefrom and having means for clamping them on the wire while moving to feed the wire and for unclamping these jaws to permit their return while said head operates to complete a cycle, and said deactivating means comprising means actuated by said detecting means for holding said jaws unclamped while moving in their wire feeding direction and releasing them at least prior to their again moving in said wire feeding direction unless again actuated by said detecting means.

2. A saddle stitched book making machine including a saddle for carrying astride thereof a travelling series of books gathered for saddle stitching, said saddle having a portion forming a book stitching station and means for causing said series to travel so as to pass thereover, a book stitcher located at said station and comprising a plurality of automatic wire stitcher heads each having wire grippers which close and open while reciprocating relative to said head for feeding wire stitching lengths each time the head is operated for stitching a book at said station and a mechanical system for operating said heads and means for powering said system continuously, said system and powering means having substantial momentum and inertia resistance to stopping and starting actions, a book caliper located to caliper said books as they travel towards said station, latch means for each of said heads for latching its said wire grippers positively open while the latter reciprocate in a wire feeding direction and for thereafter unlatching them automatically each time that head operates for said stitching operation, and means automatically responsive to said caliper for latching said latch so as to prevent feeding of a wire stitching length by said grippers.

References Cited in the file of this patent
UNITED STATES PATENTS

| | | |
|---|---|---|
| 1,287,334 | Kast | Dec. 10, 1918 |
| 1,796,143 | Davidson | Mar. 10, 1931 |
| 2,063,345 | Scott | Dec. 8, 1936 |
| 2,693,595 | Belluche | Nov. 9, 1954 |